US011415973B2

(12) United States Patent
Alam et al.

(10) Patent No.: US 11,415,973 B2
(45) Date of Patent: Aug. 16, 2022

(54) CLOUD BASED METHOD AND SYSTEM FOR OPTIMIZING TUNING OF AN INDUSTRIAL PLANT

(71) Applicant: Siemens Energy Global GmbH & Co. KG, Munich (DE)

(72) Inventors: Shamim Alam, New Delhi (IN); Ajay Sirohi, New Delhi (IN)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 218 days.

(21) Appl. No.: 16/880,242

(22) Filed: May 21, 2020

(65) Prior Publication Data

US 2020/0278666 A1 Sep. 3, 2020

Related U.S. Application Data

(63) Continuation of application No. PCT/EP2018/082987, filed on Nov. 29, 2018.

(30) Foreign Application Priority Data

Nov. 29, 2017 (EP) .................................... 17204372

(51) Int. Cl.
*G06F 9/44* (2018.01)
*G06F 9/445* (2018.01)
(Continued)

(52) U.S. Cl.
CPC ... *G05B 19/41885* (2013.01); *G06F 9/45558* (2013.01); *G06F 16/245* (2019.01);
(Continued)

(58) Field of Classification Search
CPC .... E21B 43/243; E21B 43/24; E21B 43/2401; G05B 17/02; G05B 19/41885;
(Continued)

(56) References Cited

U.S. PATENT DOCUMENTS 10,095,611 B1 * 10/2018 Hanumanthappa ......................... G06F 11/3692
2017/0090970 A1 * 3/2017 Baskaran .............. H04L 47/829

FOREIGN PATENT DOCUMENTS

EP 2924570 A2 9/2015
WO WO2014090310 A1 6/2014

OTHER PUBLICATIONS

Yamazaki et al., Simulation Platform: A cloud-based online simulation environment, 6 pages (Year: 2011).*

(Continued)

*Primary Examiner* — Thuy Dao
(74) *Attorney, Agent, or Firm* — Lempia Summerfield Katz LLC

(57) ABSTRACT

The present disclosure provides a cloud-based method and a system for optimizing tuning of an industrial plant. The method includes receiving plant engineering data associated with an industrial plant from a plant environment. Further, the method includes generating a cloud-based virtual simulation environment synchronous to the industrial plant based on the plant engineering data. The cloud-based virtual simulation environment includes one or more virtual machines for virtually simulating the plant engineering data. Further, the method includes tuning the raw process variables of the industrial plant in the cloud-based virtual simulation environment to obtain optimized tuned process variables of the industrial plant. Additionally, the method includes rendering the optimized tuned process variables for the industrial plant to a client device.

20 Claims, 12 Drawing Sheets

(51) Int. Cl.
  *G06F 9/455* (2018.01)
  *G06F 9/46* (2006.01)
  *G05B 19/418* (2006.01)
  *G06F 16/245* (2019.01)

(52) U.S. Cl.
  CPC .............. *G05B 2219/35308* (2013.01); *G06F 2009/45562* (2013.01)

(58) Field of Classification Search
  CPC .......... Y02P 90/26; Y02P 90/02; Y02P 90/80; A61P 35/00; G06F 9/45558; G06F 9/5077; G06F 16/245; G06F 9/5072; H04L 67/10; H04L 67/12; G06N 20/00
  See application file for complete search history.

(56) References Cited

OTHER PUBLICATIONS

Lei et al., Research on the architecture and application of industrial cloud experimental platform based on OpenStack, 6 pages (Year: 2017).*

International Preliminary Report on Patentability for International Patent Application PCT/EP2018/082987 dated Mar. 12, 2020.

* cited by examiner

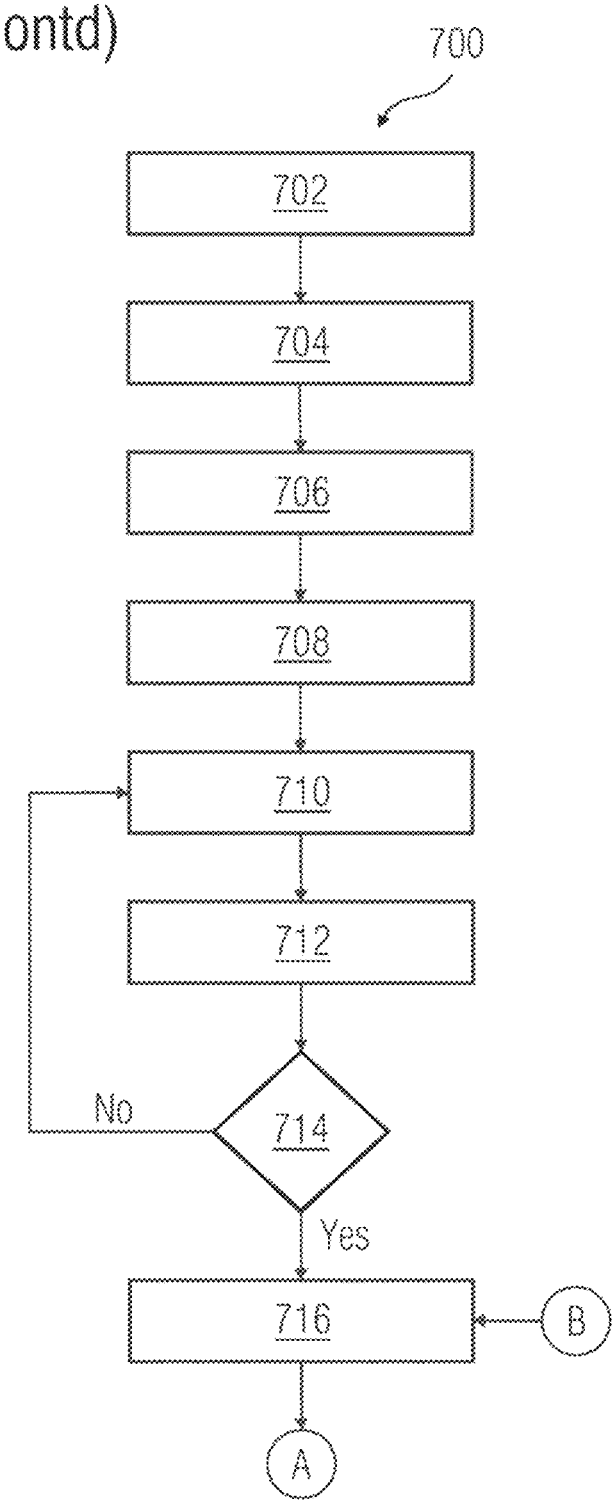

FIG 9A
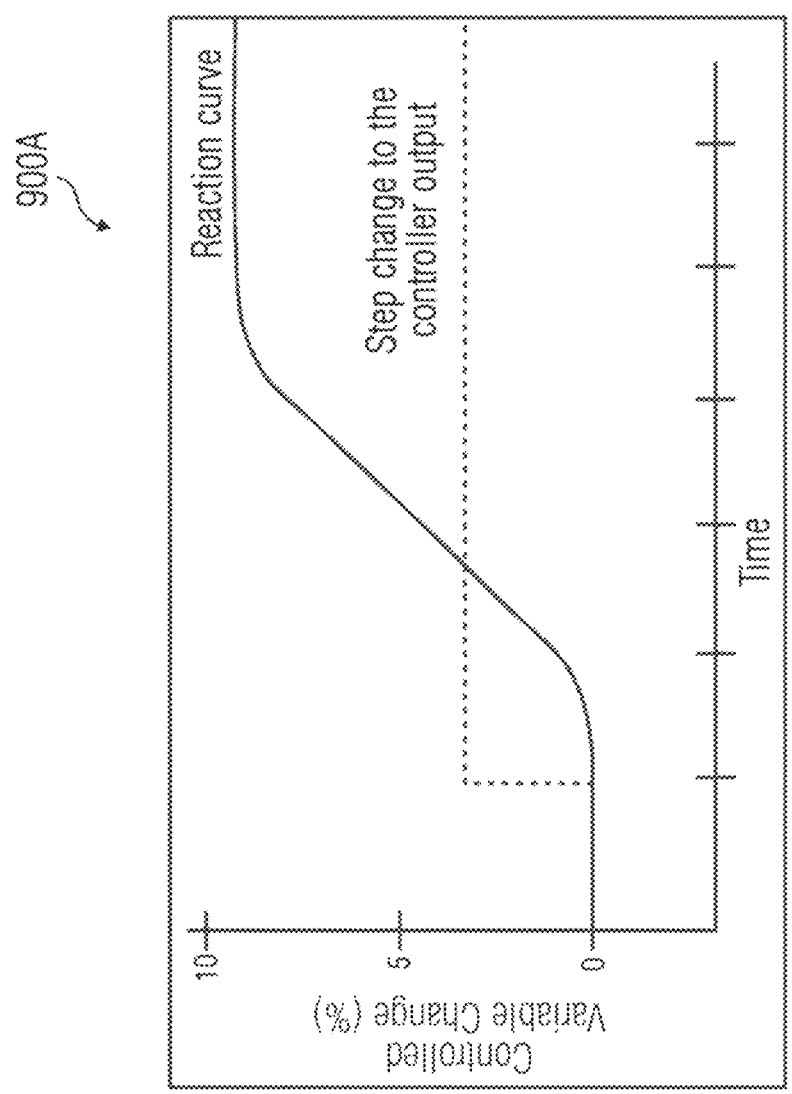
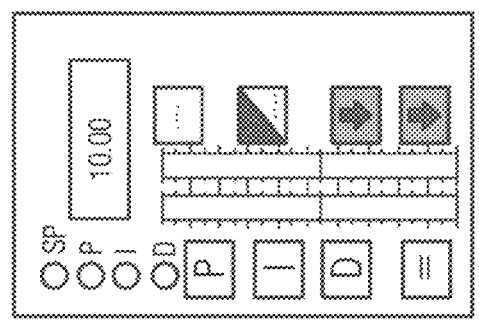

ated cloud-based virtual simulation environment. Fur-
CLOUD BASED METHOD AND SYSTEM FOR OPTIMIZING TUNING OF AN INDUSTRIAL PLANT The present patent document is a continuation of PCT Application Serial No. PCT/EP2018/082987, filed Nov. 29, 2018, designating the United States, which is hereby incorporated by reference, and this patent document also claims the benefit of European Patent Application No. 17204372.1, filed Nov. 29, 2017, which is also hereby incorporated by reference.

TECHNICAL FIELD

The present disclosure relates to the field of distributed control systems, and more particularly relates to a cloud-based method and system for optimizing tuning of an industrial plant.

BACKGROUND

In any industrial plants, process control systems are based on Proportional, Integral and Derivative (PID) type controllers, also referred as process controllers. The process controller is a control loop feedback mechanism which is commonly used in industrial control systems. The process controllers read a sensor input, and then compute a desired actuator output by calculating PID values for optimized controller output. The process controllers provide an efficient control of process parameters during steady state and transient conditions. However, tuning of process controller is the most important and complex task in a controller design. Tuning procedure is the act of selecting the proper P,PI,PID settings to control the process of an industrial plant. The performance of any controller depends on these settings. Existing systems involve I and C engineer to commission and maintain closed loop control systems. Currently, tuning of the process controllers requires several hours with high maintenance effort of several months. There are two existing mechanism known in the art for tuning a plant with the help of highly qualified experience Instrumentation and Control (I & C) engineer. These are namely, manual tuning mechanism and an auto (self) tuning mechanism. In the manual tuning mechanism, control engineer sets the following parameters manually based on his experience with trial and error method:

a. Kp is a proportional gain, a tuning parameter;
b. Ki is an integral gain, a tuning parameter; and
c. Kd is a derivative gain, a tuning parameter.

In the auto(self) tuning mechanism, a traditional PID control function as well as a self-tuning function is included which tries to maintain optimal closed-loop performance by continuously updating the controller's P, I, and D tuning parameters. However, this mechanism is restricted to perform tuning during stable conditions of the industrial plant. An unpredicted overshoot of the controller output due to the auto tuning mechanism could cause plant trip. Furthermore, until now, the auto tuning mechanism is required to be performed in presence of at least one experienced I & C engineer. This mechanism is also not suitable for processes with complex dynamics.

In light of above, there is a need for reducing efforts required to commission and maintain N number of plants situated at different locations without human intervention. Also, there is a need for a centralized tuning approach of a plant to achieve improved plant availability and commissioning time.

SUMMARY AND DESCRIPTION

Therefore it is an object of the present disclosure to provide a cloud-based method and system for optimizing tuning of an industrial plant.

The scope of the present disclosure is defined solely by the appended claims and is not affected to any degree by the statements within this summary. The present embodiments may obviate one or more of the drawbacks or limitations in the related art.

The object of the present disclosure is achieved by a method for optimizing tuning of an industrial plant in a cloud environment. The method includes receiving plant engineering data associated with an industrial plant from a plant environment. The plant engineering data includes raw process variables of the industrial plant. The plant engineering data may be received at any point of the plant, for example, during commissioning phase, plant operation phase, or plant shutdown phase. In an embodiment, the plant engineering data also includes industrial plant ID, plant configuration information and access data specific to a user of the client device. Further, the method includes generating a cloud-based virtual simulation environment synchronous to the industrial plant based on the plant engineering data. The cloud-based virtual simulation environment includes one or more virtual machines for virtually simulating the plant engineering data. In an embodiment, the one or more virtual machines includes at least one of a distributed control system server, an emulation server, and a process model. Further, the method includes tuning the raw process variables of the industrial plant in the cloud-based virtual simulation environment to obtain optimized tuned process variables of the industrial plant. Additionally, the method includes rendering the optimized tuned process variables for the industrial plant to a client device.

In an embodiment, in generating a cloud-based virtual simulation environment synchronous to the industrial plant based on the plant engineering data, the method includes filtering the plant engineering data into a predefined category based on the content of the plant engineering data. Further, the method includes extracting plant configuration information from the filtered plant engineering data. Furthermore, the method includes generating one or more virtual machines corresponding to one or more actual machines of the industrial plant to form the cloud-based virtual simulation environment based on the extracted plant configuration information. The method further includes importing the filtered plant engineering data to each of the respective one or more virtual machines. Moreover, the method includes activating the generated one or more virtual machines corresponding to one or more actual machines of the industrial plant.

In another embodiment, in tuning the raw process variables of the industrial plant in the cloud-based virtual simulation environment to obtain optimized tuned process variables of the industrial plant, the method includes determining whether the plant engineering data is available in the generated cloud-based virtual simulation environment. Further, the method includes tuning the raw process variables of the industrial plant in the cloud-based virtual simulation environment to compute process gain value, process time constant value and a dead time value of the industrial plant if the plant engineering data is available in the generated cloud-based virtual simulation environment. Also, the method includes computing tuned process variables of the industrial plant based on the computed process gain value, the process time constant value and the dead time value.

Furthermore, the method includes determining whether the tuned process variables of the industrial plant is optimized based on a decay ratio of the tuned process variables. Additionally, the method includes obtaining optimized tuned process variables of the industrial plant if the tuned process variables of the industrial plant are optimized. If the tuned process variables of the industrial plant are determined to be not optimized, then the method further includes re-tuning the tuned process variables of the industrial plant in the cloud-based virtual simulation environment to obtain the optimized tuned process variables of the industrial plant.

In yet another embodiment, the method includes disconnecting a communication session with a plant environment upon receiving the plant engineering data.

In yet another embodiment, the method includes receiving user selection of an industrial plant from a user of the client device via a software application resided on the client device. Further, the method includes retrieving optimized process variables associated with the user selected industrial plant from a database. Furthermore, the method includes rendering the optimized process variables associated with the user selected industrial plant on a graphical user interface.

The object of the present disclosure may also be achieved by system for optimizing tuning of an industrial plant in a cloud environment. The system includes a processor and a memory coupled to the processor. The memory includes an application repository having software applications stored therein. The system further includes a plant tuning management module and a tuned output rendering module stored in the form of machine-readable instructions executable by the processor.

The plant tuning management module is configured for receiving plant engineering data associated with an industrial plant from a distributed control system. The plant engineering data includes raw process variables of the industrial plant. In an embodiment, the plant engineering data also includes industrial plant ID, plant configuration information, and access data specific to a user of the client device. Further, the plant tuning management module is configured for generating a cloud-based virtual simulation environment synchronous to the industrial plant based on the plant engineering data. The cloud-based virtual simulation environment includes one or more virtual machines for virtually simulating the plant engineering data. In an embodiment, the one or more virtual machines includes at least one of a distributed control system server, an emulation server, and a process model. Furthermore, the plant tuning management module is configured for tuning the raw process variables of the industrial plant in the cloud-based virtual simulation environment to obtain optimized tuned process variables of the industrial plant. Additionally, the tuned output rendering module is configured for rendering the optimized tuned process variables for the industrial plant to a client device.

In an embodiment, in generating a cloud-based virtual simulation environment synchronous to the industrial plant based on the plant engineering data, the plant tuning management module is configured for filtering the plant engineering data into a predefined category based on the content of the plant engineering data. Further, the plant tuning management module is configured for extracting plant configuration information from the filtered plant engineering data. Also, the plant tuning management module is configured for generating one or more virtual machines corresponding to one or more actual machines of the industrial plant to form the cloud-based virtual simulation environment based on the extracted plant configuration information. The plant tuning management module is also configured for importing the filtered plant engineering data to each of the respective one or more virtual machines. Additionally, plant tuning management module is configured for activating the generated one or more virtual machines corresponding to one or more actual machines of the industrial plant.

In another embodiment, in tuning the raw process variables of the industrial plant in the cloud-based virtual simulation environment to obtain optimized tuned process variables of the industrial plant, the plant tuning management module is configured for determining whether the plant engineering data is available in the generated cloud-based virtual simulation environment. If the plant engineering data is available in the generated cloud-based virtual simulation environment, then the plant tuning management module is configured for tuning the raw process variables of the industrial plant in the cloud-based virtual simulation environment to compute process gain value, process time constant value and a dead time value of the industrial plant. The plant tuning management module is configured for computing tuned process variables of the industrial plant based on the computed process gain value, the process time constant value and the dead time value. Further, plant tuning management module is configured for determining whether the tuned process variables of the industrial plant is optimized based on a decay ratio of the tuned process variables. If the tuned process variables of the industrial plant are optimized, the plant tuning management module is configured for obtaining optimized tuned process variables of the industrial plant. If the tuned process variables of the industrial plant are not optimized, then the plant tuning management module is configured for re-tuning the tuned process variables of the industrial plant in the cloud-based virtual simulation environment to obtain the optimized tuned process variables.

In yet another embodiment, the plant tuning management module is configured for disconnecting a communication session with a plant environment upon receiving the plant engineering data.

In yet another embodiment, the tuned output rendering module is configured for receiving user selection of an industrial plant from a user of the client device via a software application resided on the client device. Further, the tuned output rendering module is configured for retrieving optimized process variables associated with the user selected industrial plant from a database. Also, the tuned output rendering module is configured for rendering the optimized process variables associated with the user selected industrial plant on a graphical user interface.

BRIEF DESCRIPTION OF THE DRAWINGS

The above-mentioned and other features of the disclosure will now be addressed with reference to the accompanying drawings. The illustrated embodiments in the drawings are intended to illustrate, but not limit the disclosure.

The present disclosure is further described hereinafter with reference to illustrated embodiments shown in the accompanying drawings, in which:

FIG. 9A-9C are schematic representations of reaction curve for computing the tuned process variables of the industrial plant, according to an exemplary embodiment.

DETAILED DESCRIPTION

Figure 1:
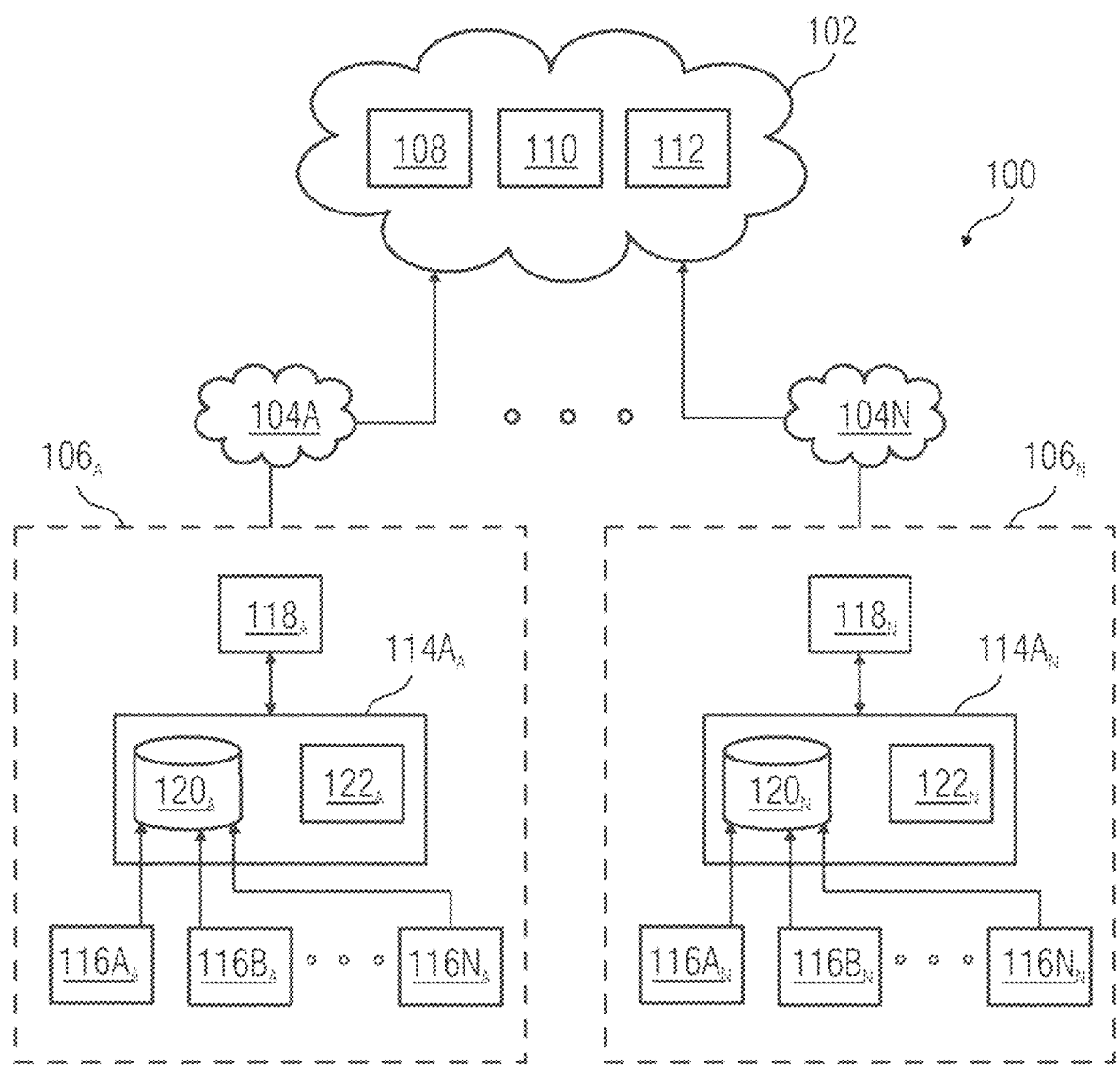
FIG. 1 is a block diagram of cloud-based tuning platform for optimizing tuning of an industrial plant, according to an embodiment.

Various embodiments are described with reference to the drawings, wherein like reference numerals are used to refer the drawings, wherein like reference numerals are used to refer to like elements throughout. In the following description, for the purpose of explanation, numerous specific details are set forth in order to provide thorough understanding of one or more embodiments. It may be evident that such embodiments may be practiced without these specific details.

FIG. 1 is a block diagram of cloud-based tuning platform 100 for optimizing tuning of an industrial plant, according to an embodiment. The cloud-based tuning platform 100 (also referred as cloud environment) includes a cloud server 102 communicatively connected to a plurality of plant environment 106A-N via a network 104 (e.g., wired or wireless network). The cloud server 102 is configured for capturing and processing data associated with the industrial plant for achieving higher performance of the industrial plant. In an embodiment, the cloud server 102 is configured for optimizing tuning of an industrial plant. In an embodiment, the cloud server 102 may be a web-server capable of system for optimizing tuning of an industrial plant in a cloud environment 100. In another embodiment, the cloud server 102 may be implemented as any desired computer system and may form a host system or server, such as a website. In an embodiment, the cloud server 102 is any server disposed at the network 104 and may be implemented as any combination of hardware and software.

The cloud server 102 includes a plant tuning management module 108, a tuned output rendering module 110 and an application repository 112. The plant tuning management module 108 is configured for receiving plant engineering data associated with an industrial plant from a distributed control system. The plant engineering data includes raw process variables of the industrial plant. In an embodiment, the plant engineering data includes raw process control variables of the industrial plant, industrial plant ID, industrial plant name, plant configuration information and access data specific to a user of the client device. For example, the plant engineering data may comprise, but not limited to, plant ID, plant name, network topology, hardware and software configuration of the plant, Input-Output list (e.g., signal-lists, function diagrams, plant displays), number of automation processors, PID values, and access data of a user. The plant engineering data is received at the cloud-based tuning platform 100 via the network 104A-N.

Further, the plant tuning management module 108 is configured for generating a cloud-based virtual simulation environment synchronous to the industrial plant based on the plant engineering data. The cloud-based virtual simulation environment is a replica of the plant environment 106A-N which is generated using the plant engineering data. The cloud-based virtual simulation environment includes one or more virtual machines for virtually simulating the plant engineering data. In an embodiment, the one or more virtual machines includes at least one of a distributed control system server, an emulation server, and a process model. The DCS server includes a dedicated computer and several client devices, such as any known personal computers or virtual machines used for evaluation of process control variables via a trend or reports. The emulation server includes components necessary for the emulation of automation systems, the signal and function modules and the high-speed closed loop controls. Such components may correspond to any known component existing in the art. The process models are a major component of the virtual simulation environment. The process models emulate both the physical power plant process and the components which are close to the processes, such as boilers, pumps, and valves. The physical power plant process may include, but not limited to Feed water heating and de-aeration, boiler operation, steam drum, superheated, steam condensing, and the like.

Further, the plant tuning management module 108 is configured for tuning the raw process variables of the industrial plant in the cloud-based virtual simulation environment to obtain optimized tuned process variables of the industrial plant. The raw process variables of the industrial plant are simulated in the virtual simulation environment to obtain the optimized tuned process variables.

In an embodiment, in generating a cloud-based virtual simulation environment synchronous to the industrial plant based on the plant engineering data, the plant tuning management module 108 is configured for filtering the plant engineering data into a predefined category based on the content of the plant engineering data. The predefined category may comprise user data category, plant configuration data category, engineering data and security data categories. The user data category includes user authentication and credential information. The plant configuration data category includes hardware configuration, software configuration, and network topology information of the plant. The engineering data category includes function diagrams, plant displays, macros, compound components, prototypes, runtime container types, runtime container numbers, peer to peer details, and types of automation servers CPUs. Further, the security data category includes firewall rules, DMZ settings, and malware prevention system. For example, if the content of the plant engineering data includes user access data, then the plant engineering data is filtered into user data category. Similarly, if the content of the plant engineering data includes plant configuration information, then the plant engineering data is filtered into plant configuration category. Each of these filtered data help in segregating the plant engineering data into respective modules of the cloud server 102 for processing. Further, the plant tuning management module 108 is configured for extracting plant configuration information from the filtered plant engineering data. In an embodiment, the plant configuration information may comprise hardware configuration of the industrial plant, software configuration of the industrial plant and network topology of the industrial plant. The plant tuning management module 108 is also configured for generating one or more virtual machines corresponding to one or more actual machines of the industrial plant to form the cloud-based virtual simulation environment based on the extracted plant configuration information. In an embodiment, the one or more virtual machines includes at least one of a distributed control system server, an emulation server, and a process model. Furthermore, the plant tuning management module 108 is also configured for importing the filtered plant engineering data to each of the respective one or more virtual machines and activating the generated one or more virtual machines corresponding to one or more actual machines of the industrial plant.

In another embodiment, in tuning the raw process variables of the industrial plant in the cloud-based virtual simulation environment to obtain optimized tuned process variables of the industrial plant, the plant tuning management module 108 is configured for determining whether the plant engineering data is available in the generated cloud-based virtual simulation environment. If the plant engineering data is available in the generated cloud-based virtual simulation environment, then the plant tuning management module 108 is configured for tuning the raw process variables of the industrial plant in the cloud-based virtual simulation environment to compute process gain value, process time constant value and a dead time value of the industrial plant. If the plant engineering data is unavailable in the generated cloud-based virtual simulation environment, then the plant tuning management module 108 is configured for re-importing the filtered plant engineering data to each of the respective one or more virtual machines and activating the generated one or more virtual machines corresponding to one or more actual machines of the industrial plant.

Further, the plant tuning management module 108 is configured for computing tuned process variables of the industrial plant based on the computed process gain value, the process time constant value and the dead time value. Also, the plant tuning management module 108 is configured for determining whether the tuned process variables of the industrial plant is optimized based on a decay ratio of the tuned process variables. Additionally, the plant tuning management module 108 is configured for obtaining optimized tuned process variables of the industrial plant if the tuned process variables of the industrial plant are optimized. Moreover, if the tuned process variables of the industrial plant are not optimized, then the tuning management module 108 is configured for re-tuning the tuned process variables of the industrial plant in the cloud-based virtual simulation environment to obtain the optimized tuned process variables of the industrial plant.

In yet another embodiment, the plant tuning management module 108 is configured for disconnecting a communication session with a plant environment upon receiving the plant engineering data.

The tuned output rendering module 110 is configured for rendering a tuning application on the client device, such as on the DCS 114. The tuned output rendering module 110 is configured for handling user specific information and controlling the access of the users on the tuning application. The tuned output rendering module 110 may also act as a tuning application provisioning module for provisioning the tuning application on the client devices, such as DCS 114. Further, the tuned output rendering module 110 is configured for rendering the optimized tuned process variables for the industrial plant to a client device, such as plant environment 106A-N. In an embodiment, the tuned output rendering module 110 is also configured for receiving a user selection of an industrial plant from a user of the client device, such as 106A-N via a software application resided on the client device, such as a tune agent 122. Further, the tuned output rendering module 110 is configured for retrieving optimized process variables associated with the user selected industrial plant from a database, such as application repository 112 and rendering the optimized process variables associated with the user selected industrial plant on a graphical user interface. In an embodiment, the tuned output rendering module 110 is configured for rendering the optimized process variables associated with the user selected industrial plant based on access privileges defined for the user of the client device. The access privileges may be pre-stored in a memory.

The application repository 112 stores the optimized process variables of the industrial plant. The application repository 112 also stores the access privileges defined for each user at the client device. Further, the application repository 112 includes a lookup table having a list of industrial plants mapped to each user profiles. User profiles identify a type of user and define specific access privileges for that user. For example, user profiles may include administrator roles and plant customer role. Each of these user profiles has defined user roles. The access privileges for each user may include permissions to view and download process control variables of the industrial plant.

Also, a user at a specific client device may configure a specific industrial plant applicable for him in his user profile and access the tuning application based on this user profile. The lookup table further includes industrial plants mapped to relevant units, areas, server, and type of engineering and specific closed loop control systems. For example, the units may be Unit 1, Unit 2, Unit 3 . . . and Unit n. The areas may be boiler area, turbine area, balance of plant, water circulation pump area, ash handling area and so on. The server may be a non-redundant server or a redundant server. The types of engineering may be I&C Engineering. The specific closed loop control systems may be feed water level control loop, stream drum level control loop, steam temperature control loop, steam pressure control loop, and so on.

The plant environment 106$_A$-106$_N$ includes one or more field devices 116A$_{A-N}$-116N$_{A-N}$ communicatively connected to a distributed control system 114A$_{A-N}$. The distributed control system (DCS) 114A$_{A-N}$ is further communicatively connected to a gateway 118A-N. The distributed control system 114A$_{A-N}$ captures the plant engineering data from the field devices 116A$_{A-N}$-116N$_{A-N}$. The distributed control system 114A$_{A-N}$ includes a tune agent 122A-N and a distributed control system (DCS) database 120A-N. The tune agent 122A-N resided in the DCS 114A$_{A-N}$ is configured for collecting plant engineering data from the devices 116A$_{A-N}$-116N$_{A-N}$ and storing the plant engineering data in the DCS database 120A-N. The gateway 118A-N manages data extraction and data provisioning from the plant environment 106A-N to the cloud server 102. In an embodiment, the DCS 114 may be referred as 'client device'. The DCS system 114 may be a desktop computer or terminal, or any desired handheld or portable wireless user device, such as a personal computer, a Smartphone, a tablet, a laptop computer, a personal digital assistant, and combinations thereof, for example. Further, the DCS 114 may include a user interface for visualizing the cloud-based tuning platform 100. In an embodiment, the user interface may be a web browser or web application running on the DCS 114 and is capable of accessing a website and/or communicating information and/or data with a web server such as the cloud server 102 over a network, such as the network 104. Users of the DCS 114A$_{A-N}$ may access the cloud server 102 via the user interface. For example, the user may send a request to the cloud server 102 to obtain optimized process variables of the industrial plant from the DCS 114A$_{A-N}$. The user interface may be specifically designed for accessing the plant tuning management module 108 in the cloud server 102.

Throughout the specification, the terms 'plant environment 106A-N' and the term 'plant environment 106' are used interchangeably. Similarly, throughout the specification the terms 'DCS 114A$_{A-N}$' and 'DCS 114' are used interchangeably.

One skilled in the art could understand that the cloud server 102 may be a remote server residing outside the plant. Also, one skilled in the art could understand that the server 102 may be a component of a cloud infrastructure for providing the functionality described above. The plant tuning management module 108 may take a form of software application executed on the distributed control system or hosted on a cloud platform and executed by one or more processors on the cloud platform. Alternatively, the plant tuning management module 108 may be embedded software in a control system code.

Figure 2:
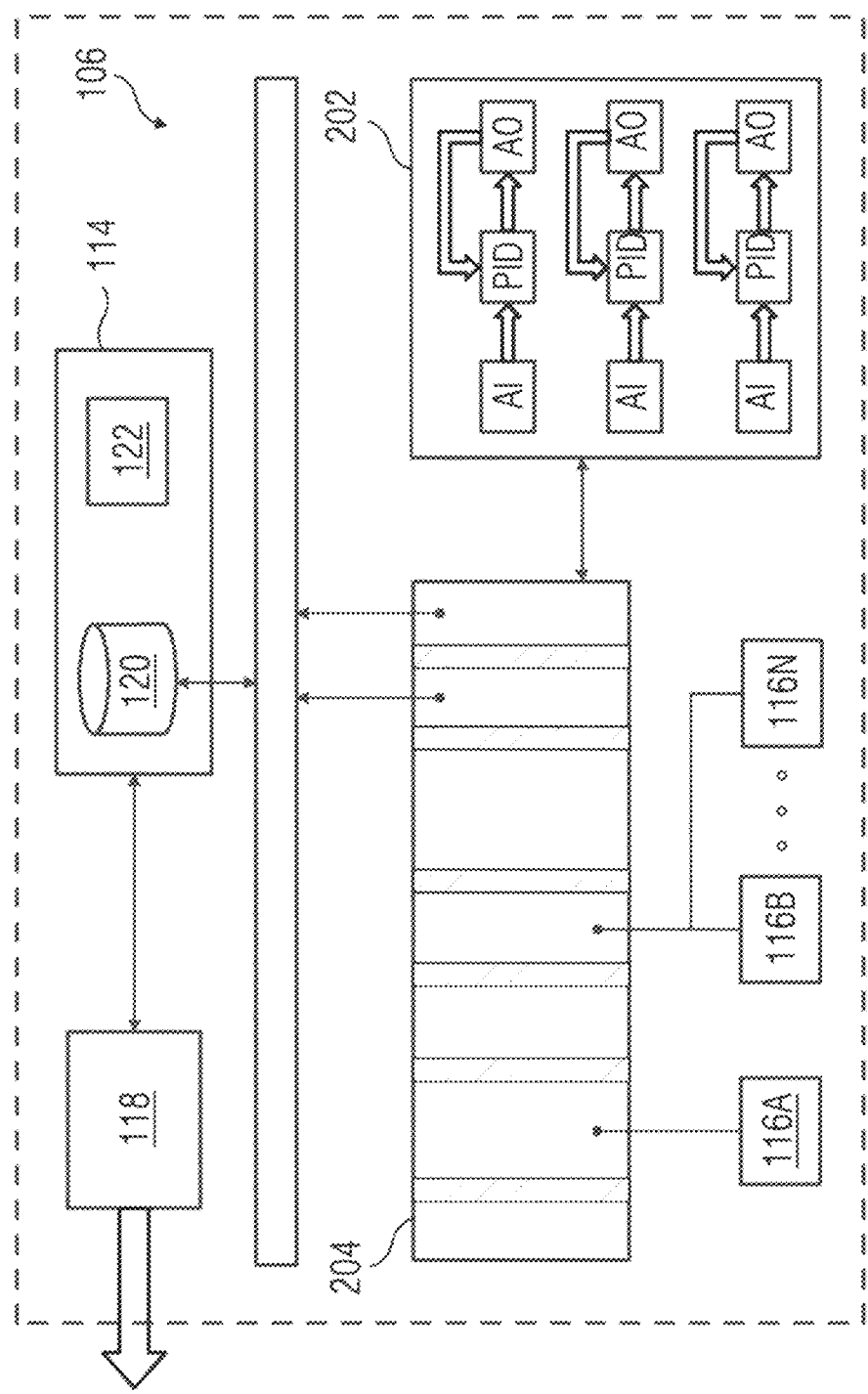
FIG. 2 is a block diagram of a plant environment as shown in FIG. 1, according to an embodiment.

FIG. 2 is a block diagram of a plant environment 106 as shown in FIG. 1, according to an embodiment. In FIG. 2, the plant environment 106 includes a plurality of field devices 116A-N, a closed loop control system 202, an input-output device 204, a distributed control system 114, and a gateway 118.

The plurality of field devices 116A-N may comprise sensors, valves, transmitters, positioners, or any other field devices known in the art. The plurality of field devices 116A-N may transmit the data using any communication protocols known in the art. For example, the plurality of field devices 116A-N may be smart field devices which communicate with the DCS 114 through wireless communication systems, such as radio frequency signals, Bluetooth, or Wi-Fi. The closed loop control system 202 are engineered and running including a number of control loops. Each of the control loops are also referred as 'control modules'. In an embodiment, the control loops perform single loop control using single-input/single-output. The closed loop control system 202 includes a PID control block connected to appropriate analog input (AI) and analog output (AO) function blocks which are associated with for example, control devices such as valves, measurement devices such as temperature and pressure transmitters or any other devices within a process control system. The input-output device 204 may be input-output cards conforming to any desired communication or controller protocol known in the art.

The distributed control system (DCS) 114 includes a DCS database 120 and a tune agent 122. The tune agent 122 is configured for collecting plant engineering data from the DCS database 120. The tune agent 122 is also configured for uploading the plant engineering data into the cloud server 102 through a gateway 118. In an embodiment, the tune agent 122 is installed on a DCS server 114. The gateway 118 is responsible for pushing the plant engineering data from the DCS 114 to the cloud server 102. In an embodiment, the gateway 118 may be a terminal server. In an embodiment, the gateway 118 provides data security of the plant engineering data while transmission. The data transmission of the plant engineering data from the DCS 114 to the cloud server 102 through the gateway 118 may be at periodic intervals or event triggered or on a manual upload basis. In an exemplary embodiment, data transfer of plant engineering data between the DCS 114 and the cloud server 102 is implemented as file transfer using secure shell (SSH) and SSH file transfer (SFTP) protocol for communication in the network, say network 104.

One skilled in the art could understand that the above plant environment 106 may support data transmission of the plant engineering data from the DCS 114 to cloud server 102 without the gateway 118. In this embodiment, the DCS 114 may be equipped to support wireless communication between the DCS 114 and the cloud server 102 directly using any known wireless communication protocols, (for e.g., Wi-Fi, internet, or WLAN).

Figure 3:
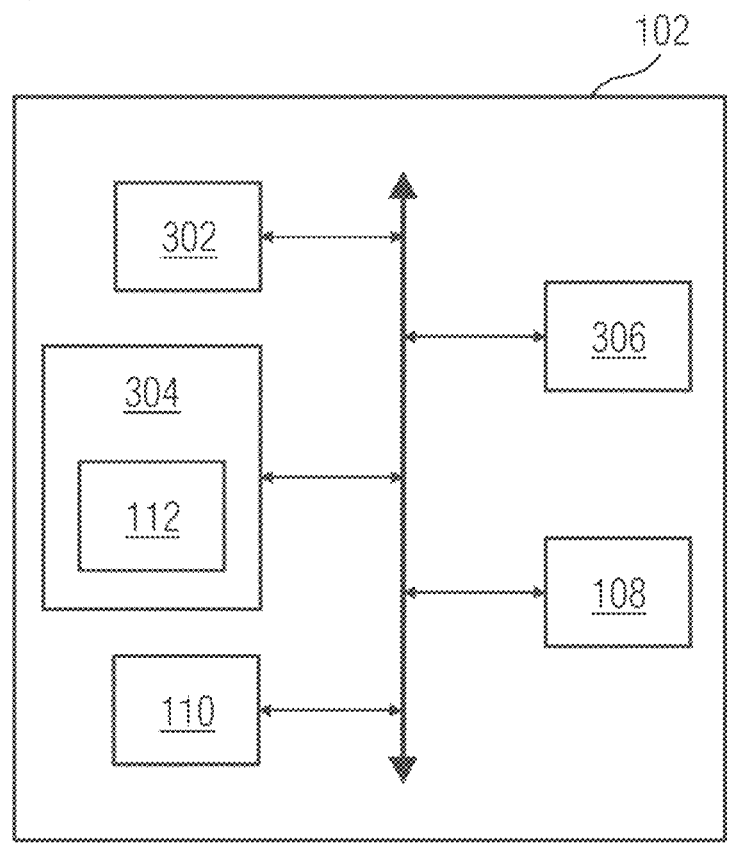
FIG. 3 is a block diagram of a cloud server as shown in FIG. 1, according to an embodiment.

FIG. 3 is a block diagram of a cloud server 102 as shown in FIG. 1, according to an embodiment. The cloud server 102 includes a processor 302, a memory 304, a communication interface 306, a plant tuning management module 108 and a tuned output rendering module 110.

The processor 302, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor(s) 302 may be one or more processing units (e.g., servers) capable of processing requests from the DCS 114. The processor(s) 302 is also capable of executing machine-readable instructions stored on a computer-readable storage medium such as the memory unit 304 for performing various functions such as processing plant data, analyzing plant data, providing visualization of the analyzed plant data, and so on.

The memory 304 may be volatile memory and non-volatile memory. A variety of computer-readable storage media may be stored in and accessed from the memory 304. The memory 304 may include any suitable elements for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. In the embodiment, the memory unit 304 includes an application repository 112. The application repository 112 is capable of storing optimized values of process variables corresponding to a plurality of industrial plants situated across different geographical locations.

The communication interface 306 is configured to enable a communication channel between the DCS 114 and the cloud server 102.

The plant tuning management module 108 and the tuned output rendering module 110 may take a form of hardware such as a processor with embedded software, or a computer program in the form machine-readable instructions stored on a computer program product (e.g., the memory unit 304) and executable by the processor(s) 302.

The plant tuning management module 108 is configured for processing the plant engineering data received from the plant environment 106 to obtain optimized process variables values for the industrial plant. The acts performed by the plant tuning management module 108 are explained in greater detail in FIG. 4. The tuned output rendering module 108 is configured for rendering the optimized process variables specific to the industrial plant to the client device, such as DCS 114 or any other user device. In an embodiment, the tuned output rendering module 108 is configured for receiving a user selection of an industrial plant from a user of the client device, such as the DCS 114 via a software application resided on the client device, such as the tune agent 122. The tuned output rendering module 108 is further configured for retrieving optimized process variables associated with the user selected industrial plant from the database, such as process variable repository 112 and rendering the optimized process variables associated with the user selected industrial plant on a graphical user interface.

Those of ordinary skilled in the art will appreciate that the hardware depicted in FIG. 3 may vary for particular implementations. For example, other peripheral devices such as an optical disk drive and the like, Local Area Network (LAN), Wide Area Network (WAN), Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

Those skilled in the art will recognize that, for simplicity and clarity, the full structure and operation of all cloud-based systems, such as the cloud server 102, suitable for use with the present disclosure is not being depicted or described herein. Instead, only so much of a cloud-based system, such as the server 102, as is unique to the present disclosure or necessary for an understanding of the present disclosure is depicted and described. The remainder of the construction and operation of the server 102 may conform to any of the various current implementation and practices known in the art.

Figure 4:
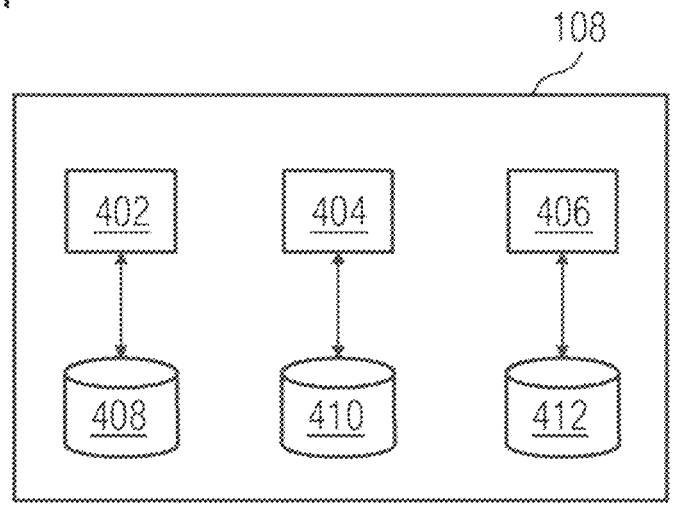
FIG. 4 is a block diagram illustrating various modules of a plant tuning management module of FIG. 1, according to an embodiment.

FIG. 4 is a block diagram illustrating various modules of a plant tuning management module 108 of FIG. 1, according to an embodiment. The plant tuning management module 108 includes a tuning landing module 402, a virtual simulation environment generator module 404, a tuning optimization module 406, a tuning landing database 408, a virtual simulation environment database 410, and a tuned output database 412.

The tuning landing module 402 is configured for receiving plant engineering data associated with an industrial plant from a plant environment, such as plant environment 106. The plant engineering data includes raw process control variables of the industrial plant, industrial plant ID, plant configuration information and access data specific to a user of the client device. For example, the plant engineering data may comprise, but not limited to, plant ID, plant name, network topology, hardware, and software configuration of the plant, Input-Output list (signal-lists, function diagrams, plant displays), number of automation processors, PID values, and access data of a user. The plant engineering data is received at the cloud server 102 via the network 104A-N. In an exemplary embodiment, the plant engineering data corresponds to raw plant engineering data in, for example, a zip file format. The tuning landing module 402 is then configured for unzipping the raw plant engineering data for further processing. The raw plant engineering data and the unzipped plant engineering data are stored in the tuning landing database 408. The tuning landing module 402 also is configured for filtering the plant engineering data into a predefined category based on the content of the plant engineering data. In an embodiment, the predefined category may comprise user data category, plant configuration data category, engineering data, and security data categories. Each of these categories are defined above. For example, if the content of the plant engineering data includes user access data, then the plant engineering data is filtered into user data category. Similarly, if the content of the plant engineering data includes plant configuration information, then the plant engineering data is filtered into plant configuration category. Each of these filtered data help in segregating the plant engineering data into respective modules of the cloud server 102 for processing. The filtered plant engineering data is stored in the tuning landing database 408. In an embodiment, the tuning landing module 402 is configured for filtering the plant engineering data to extract the plant configuration information. In other words, the tuning landing module 402 is configured for extracting plant configuration information from the filtered plant engineering data. For example, if the filtered plant engineering data includes plant configuration information, the current process variables of the plant, and the network topology of the plant, the tuning landing module 402 extracts the plant configuration information from this filtered plant engineering data. The extracted plant configuration information is stored in the tuning landing database.

In an embodiment, the tuning landing module 402 is also configured for encapsulating and decapsulating the plant engineering data based on one or more data security protocols known in the art. In another embodiment, the tuning landing module 402 is configured for triggering at the communication interface 306 the disconnection of communication session with the plant environment 106 upon receiving the plant engineering data.

The tuning landing module 402 feeds the extracted plant configuration information as an input to the virtual simulation environment generator module 404.

The virtual simulation environment generator module 404 obtains the plant configuration information as an input for further processing. The virtual simulation environment generator module 404 is configured for generating a cloud-based virtual simulation environment synchronous to the industrial plant based on the plant engineering data. The cloud-based virtual simulation environment includes one or more virtual machines for virtually simulating the plant engineering data. In an embodiment, the cloud-based virtual simulation environment corresponds to a virtual industrial plant environment. In an exemplary embodiment, if the plant engineering data is received from a plant environment such as plant environment 106, a virtual simulation environment exactly similar to the plant environment 106 is generated. That is, the plant environment 106 is identified to comprise a DCS 114, field devices 116A-N, and a closed loop control systems 202. Now, the virtual simulation environment generator module 404 in the cloud server 102 generates the virtual simulation environment including the same set of virtual components, e.g., a virtual DCS, virtual field devices, and the virtual closed loop control systems similar to the DCS 114, the field devices 116A-N, and the closed loop control system 202 of the actual industrial plant.

In an embodiment, in generating the cloud-based virtual simulation environment, the virtual simulation environment generator module 404 is configured for generating one or more virtual machines corresponding to one or more actual machines of the industrial plant to form the cloud-based virtual simulation environment based on the extracted plant configuration information. The virtual simulation environment generator module 404 reads the plant configuration information including hardware configuration, software configuration and network topology of the industrial plant to create a virtual simulation environment. In an exemplary implementation, to create a virtual simulation environment, the virtual simulation environment generator module 404 initially creates one or virtual machines synchronous to actual industrial plant machines by identifying the one or more actual industrial plant machines configured at the industrial plant. For example, if an industrial plant IP₁ includes 'n' number of actual machines, the virtual simulation environment generator module 404 fetches this information from the filtered plant engineering data and generates one or more virtual machines, which is the replica of the actual industrial machines at the industrial plant, in the cloud.

Further, the virtual simulation environment generator module 404 generates emulators, a replica of automation processor running in the plant, upon generating the one or more virtual machines. The emulators are generated by identifying the number of automation processors present in the industrial plant and the configurations associated with each of these number of automation processors present at the industrial plant.

Furthermore, the virtual simulation environment generator module 404 then creates process models, a replica of field devices present at the industrial plant, upon generating the emulators. The process models are created by identifying the network topology of the industrial plant, fetching the device configuration information of the industrial plant, and retrieving the field devices present at the industrial plant to create the process models corresponding to each of these retrieved field devices actually present at the industrial plant.

The combination of virtual machines, emulators, and the process models form the cloud-based virtual simulation environment synchronous to the actual plant environment. The cloud-based virtual simulation environment enables the cloud server 102 to simulate/tune the process variables at the cloud-based tuning platform 100 without any dependency on the plant environment 106. This virtual simulation environment eliminates the dependency on the plant environment 106 and thus is able to tune or simulate the industrial plant completely at the cloud-based tuning platform 100 with no connection to the plant environment 106.

Additionally, the virtual simulation environment generator module 404 is configured for importing the filtered plant engineering data to each of the respective virtual machines of the virtual simulation environment. With this step, each of the virtual machines is loaded with relevant configuration information require to simulate the industrial plant. For example, if the virtual machine is a DCS 114, then the DCS 114 at the virtual simulation environment is loaded with entire plant engineering information required to act as the actual DCS 114 at the industrial plant. In an embodiment, the virtual machines may be loaded with relevant plant engineering diagrams required for simulating the plant engineering data.

Furthermore, the virtual simulation environment generator module 404 is configured for activating the generated one or more virtual machines corresponding to one or more actual machines of the industrial plant upon importing the filtered plant engineering data into each of the respective one or more virtual machines. The process of activation is performed automatically by the virtual simulation environment generator module 404. The activated virtual simulation environment then triggers the tuning optimization module 406 to perform tuning of the industrial plant. The generated virtual simulation environment is stored in the virtual simulation environment database 410. The virtual simulation environment database 410 also stores the configuration information associated with each of the virtual machines. In an embodiment, a virtual simulation environment may be stored as a template environment in the virtual simulation environment database 410 for processing the plant engineering data of plant environment 106 or any other plant environment connected to the cloud server 102. The template environment stored may be used by the virtual simulation environment generation module 404 for processing any data further.

The tuning optimization module 406 is configured for tuning the raw process variables of the industrial plant at the cloud-based virtual simulation environment to obtain optimized tuned process variables of the industrial plant. The raw process variables of the industrial plant are retrieved from the received plant engineering data. In order to tune the raw process variables of the industrial plant at the cloud-based virtual simulation environment, the tuning optimization module 406 is configured to determine whether the plant engineering data is available in the generated cloud-based virtual simulation environment. This determination is based on a comparison of plant engineering data in tuning landing database 408 with the data corresponding to the generated virtual machines, stored in the virtual simulation environment database 410. If the plant engineering data is determined to be available in the generated cloud-based virtual simulation environment, then the tuning optimization module 406 is configured for tuning the raw process variables of the industrial plant at the cloud-based virtual simulation environment to compute process gain value, process time constant value and a dead time value of the industrial plant. The process of tuning the raw process variables to compute the process gain value, the process time constant value and the dead time value is described below.

In an exemplary implementation, if the plant engineering data is determined to be available in the generated cloud-based virtual simulation environment, the tuning optimization module 406 is configured to initially switch the control loop control systems in manual mode. Further, the tuning optimization module 406 is configured to perform a step test on the raw process variables of the industrial plant to create a reaction curve for which the virtual closed loop control system at the virtual simulation environment is forced to increase the output abruptly. The curve traced by the change in process variables is called the reaction curve. A slope line tangent to the reaction curve at its steepest point shows how fast the process reacted to the step change in the virtual closed loop control system's output. The inverse of the slope of this line is the process time constant (T) which measures the severity of the lag. The reaction curve illustrates how long the virtual closed loop control system took for the process to demonstrate initial reaction to the step test. This gives the dead time (d) value. Also, the reaction curve illustrates how much the process variable increased relative to the size of the step. This gives the process gain (k) value. By performing the above step test, the process time constant (T), the dead time (d) value, and the process gain (k) are computed. Hence, the process gain value (k), the process time constant (T) and the dead time value (d) are computed by tuning the raw process variables of the industrial plant at the virtual simulation environment.

Further, the tuning optimization module 406 is configured for computing the tuned process variables of the industrial plant based on the computed process gain (k) value, process time constant (T) and the dead time value (d). The detailed acts of tuning the raw process variables at the virtual simulation environment are described further in FIGS. 9A-9C.

In an exemplary implementation, the tuning optimization module 406 uses Ziegler-Nichols method for tuning the raw process variables. In this method, the values of T, d and k are used for computing the best setting for process variables, which is P, $T_1$, and $T_D$ as follows:

$$P = \frac{1.2*T}{K*d} \quad \text{equation (1)}$$

$$T1 = 2*d \quad \text{equation (2)}$$

$$T_D = 0.5*d \quad \text{equation (3)}$$

With the above equations (1), (2), and (3), the tuned process variables P, $T_1$, and $T_D$ of the industrial plant are computed.

Upon computing the tuned process variables P, $T_1$, and $T_D$ of the industrial plant, the tuning optimization module 406 is configured for determining whether the tuned process variables of the industrial plant is optimized based on a decay ratio of the tuned process variables. In an exemplary implementation, the computed tuned process variables of the industrial plant are evaluated to obtain the optimized tuned process variables of the industrial plant. In an exemplary implementation, the tuning optimization module 406 collects the computed tuned process variables of the industrial plant automatically for each closed loop control systems and evaluates the computed tuned process variables of the industrial plant based on a predefined decay ratio. For example, a step test is again performed for the computed tuned process variables to analyze the reaction curve. If the resultant reaction curve has no offset and a ¼ decay ratio, then the computed tuned process variables are declared as optimized tuned process variables. If the resultant reaction curve has an offset value and a decay ratio less than the ¼ decay ratio, then the computed tuned process variables are re-tuned at the virtual simulation environment to obtain optimized tuned process variables of the industrial plant. The optimized tuned process variables are reported through a trend. The trend is a graphical presentation of any change in the process variable over the period of time in the form of a line or a curve. In this context, the trend helps to plot the curve of process variable to calculate decay ratio. The optimized tuned process variables specific to the industrial plant are saved in the tuned output database 412. The tuned put-put database 412 also stores the computed tuned process variables, the computed process gain value (k), the dead time value (d) and the process time constant (T). Further, the tuned output database 412 also stores the decay ratio and the offset value of each process variable settings.

In an embodiment, the tuning optimization module 406 provides the optimized tuned process variables of the industrial plant to the tuned output rendering module 110.

On the contrary, if the plant engineering data is determined to be unavailable in the generated cloud-based virtual simulation environment, then the tuning optimization module 406 is configured to repeat the act of importing filtered plant engineering data into each respective virtual machine.

Figure 5:
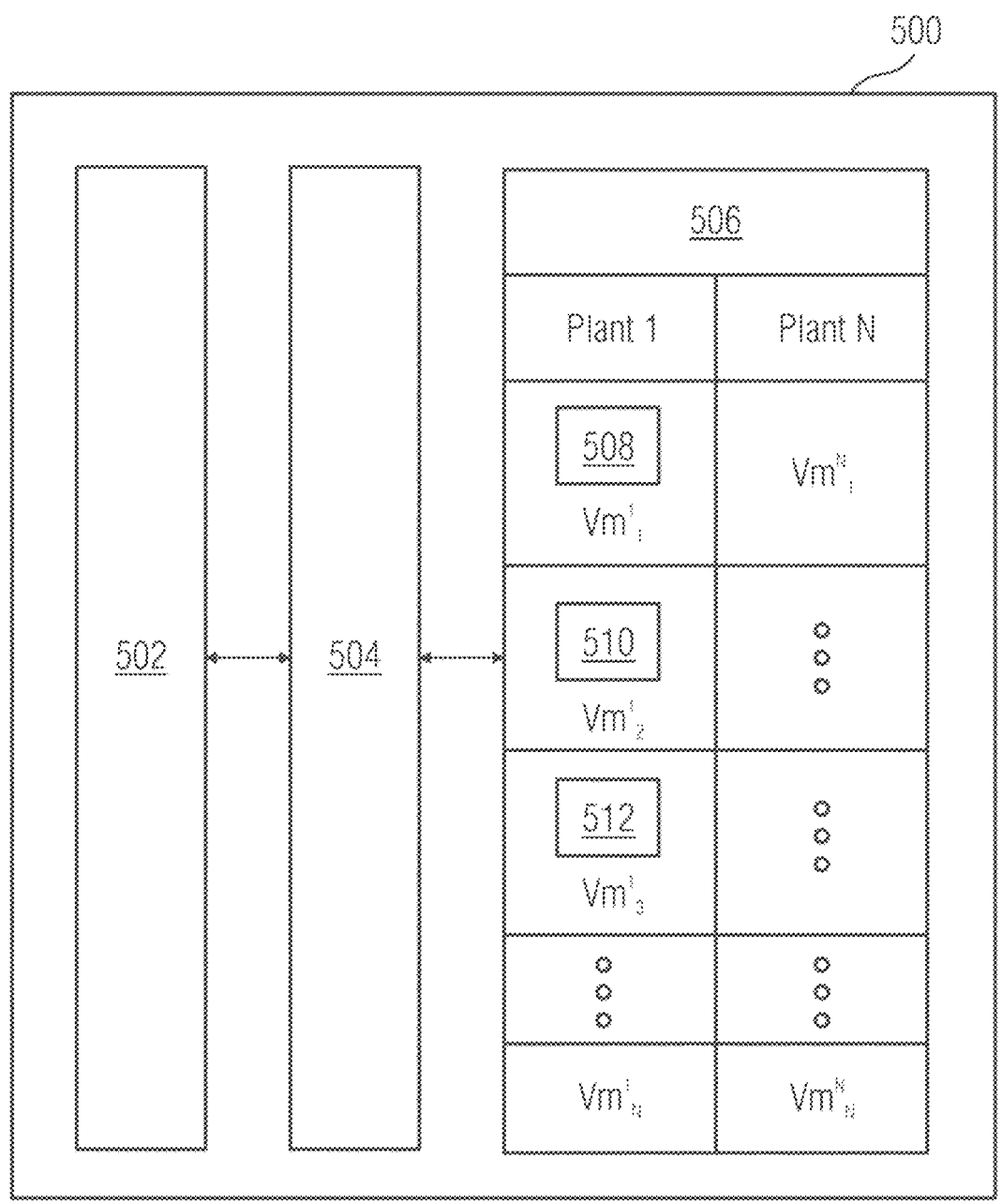
FIG. 5 is a block diagram of a simulation environment generation system, according to an embodiment.

FIG. 5 is a block diagram of a simulation environment generation system 500, according to an embodiment. In an embodiment, the simulation environment generation system 500 is implemented as extended part of virtual simulation environment generator module 404 as shown in FIG. 4. The simulation environment generation system 500 includes a plant data processing module 502, a deployment server 504 and a simulation environment 506. The plant data processing module 502 processes the plant configuration information to identify the various components of the industrial plant and the network topology of the industrial plant. The identified components of the industrial plant and the network topology of the industrial plant are fed to the deployment server 504. The deployment server 504 is responsible for building virtual machines corresponding to the identified components of the industrial plant and the network topology of the industrial plant. The deployment server 504 further defines the configurations for each of the built virtual machines. The configurations may include but not limited to CPU, RAM, storage, network capacity, and the like. Once the configurations of virtual machines are completed, the deployment server 504 merges the virtual machines in a specific manner and outputs a virtual simulation environment 506. The simulation environment 506 includes a plurality of virtual machines specific for each industrial plant. For example, for industrial Plant 1, the virtual machines may comprise a virtual DCS 508, a virtual emulation server 510, a virtual process model 512, and the like. Each of these virtual machines is configured to act in the same manner as that of the actual machines in the industrial plant 1. Each of the virtual machines specific to the industrial plant are imported with relevant filtered engineering data and are activated. Activation process involves installing respective software images in the corresponding virtual machines from the deployment server 504. The simulation environment 506 is used for simulating or emulating or tuning the process variables of the industrial plant to obtain optimized tuned process variables specific to industrial plant.

Figure 6:
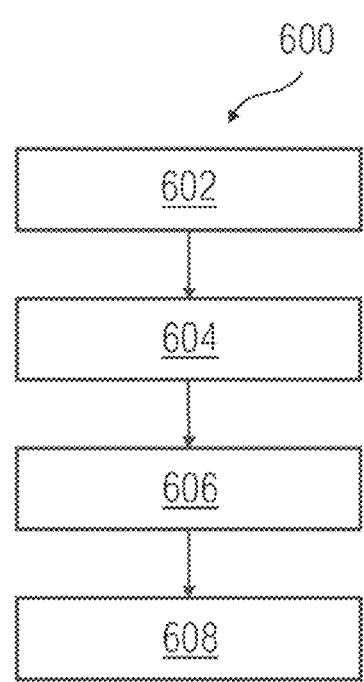
FIG. 6 is a flowchart illustrating an exemplary method for optimizing tuning of an industrial plant in a cloud environment, according to an embodiment.

FIG. 6 is a flowchart illustrating an exemplary method 600 for optimizing tuning of an industrial plant 106 in a cloud-based tuning platform 100, according to an embodiment. At act 602, plant engineering data associated with an industrial plant is received from a plant environment 106 via a network 104. The plant engineering data includes raw process control variables of the industrial plant, industrial plant ID, plant configuration information and access data specific to a user of the client device. At act 604, a cloud-based virtual simulation environment synchronous to the industrial plant is generated based on the plant engineering data. The cloud-based virtual simulation environment includes one or more virtual machines for virtually simulating the plant engineering data. The one or more virtual machines includes at least one of a distributed control system server, an emulation server, and a process model. At act 606, the raw process variables of the industrial plant are tuned at the cloud-based virtual simulation environment to obtain optimized tuned process variables of the industrial plant. At act 608, the optimized tuned process variables for the industrial plant are rendered to a client device, such as DCS 114.

Figure 7:
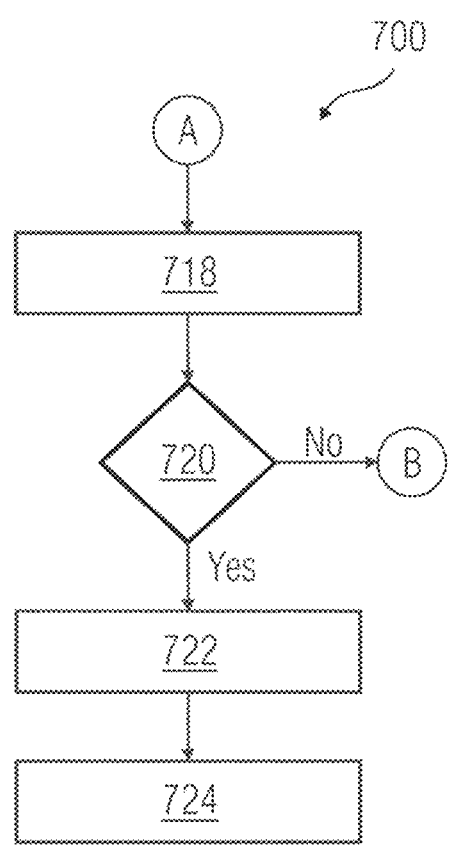
FIG. 7 is a flowchart illustrating an exemplary method for optimizing tuning of an industrial plant in a cloud environment, according to another embodiment.

FIG. 7 is a flowchart illustrating an exemplary method 700 for optimizing tuning of an industrial plant 106 in a cloud-based tuning platform 100, according to another embodiment. At act 702, plant engineering data associated with an industrial plant is received from a plant environment 106 via a network 104. The plant engineering data includes raw process control variables of the industrial plant, industrial plant ID, plant configuration information and access data specific to a user of the client device. At act 704, the plant engineering data is filtered into a predefined category based on the content of the plant engineering data. The predefined category may comprise user data category, plant configuration data category, engineering data and security data categories. For example, if the content of the plant engineering data includes user access data, then the plant engineering data is filtered into user data category. Similarly, if the content of the plant engineering data includes plant configuration information, then the plant engineering data is filtered into plant configuration category. In an embodiment, the filtered plant engineering data includes user data configuration, plant configuration data, engineering data and security data.

At act 706, plant configuration information is extracted from the filtered plant engineering data. The plant configuration information includes hardware configuration, software configuration and the network topology of the industrial plant. At act 708, one or more virtual machines corresponding to one or more actual machines of the industrial plant are generated to form the cloud-based virtual simulation environment based on the extracted plant configuration information. The one or more virtual machines includes, but not limited to at least one of a distributed control system server, emulation server and a process model.

At act 710, the filtered plant engineering data is imported to each of the respective one or more virtual machines. At act 712, the generated one or more virtual machines corresponding to one or more actual machines of the industrial plant are activated in the virtual simulation environment.

At act 714, it is determined whether the plant engineering data is available in the generated cloud-based virtual simulation environment. If the plant engineering data is unavailable in the generated cloud-based virtual simulation environment, then the process acts 710 to 712 are repeated. On the contrary, if the plant engineering data is available in the generated cloud-based virtual simulation environment, then at act 716, the raw process variables of the industrial plant are tuned at the cloud-based virtual simulation environment to compute process gain value, process time constant value and a dead time value of the industrial plant. At act 718, tuned process variables of the industrial plant are computed based on the computed process gain value, the process time constant value and the dead time value.

At act 720, it is determined whether the tuned process variables of the industrial plant are optimized based on a decay ratio of the tuned process variables. If it is determined that the tuned process variables of the industrial plant is not optimized based on the decay ratio of the tuned process variables, then process acts 716-718 are repeated. On the contrary, if it is determined that the tuned process variables of the industrial plant is optimized based on the decay ratio of the tuned process variables, then at act 722, optimized tuned process variables of the industrial plant are obtained. At act 724, the optimized tuned process variables for the industrial plant are rendered to a client device, such as DCS 114.

In rendering the optimized tuned process variables for the industrial plant, a user selection of an industrial plant is received from a user of the client device via a software application resided on the client device. Later, optimized process variables associated with the user selected industrial plant is retrieved from the database and the optimized process variables associated with the user selected industrial plant is rendered on a graphical user interface.

Figure 8:
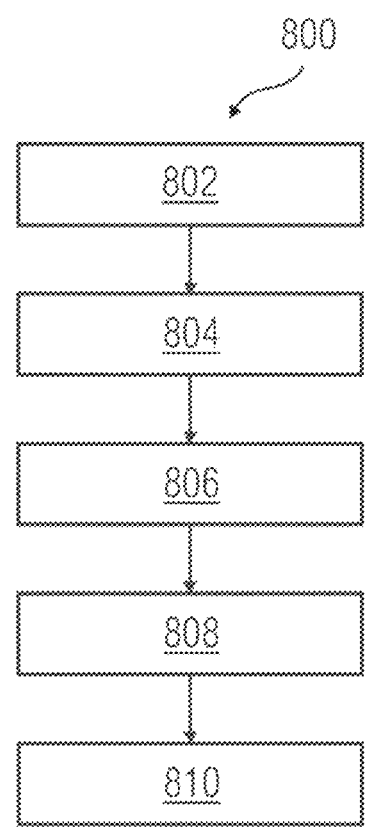
FIG. 8 is a flowchart illustrating an exemplary method for tuning the raw process variables of the industrial plant in the cloud-based virtual simulation environment to compute process gain value, process time constant value and a dead time value of the industrial plant, according to an embodiment.

FIG. 8 is a flowchart illustrating an exemplary method 800 for tuning the raw process variables of the industrial plant 106 in the cloud-based virtual simulation environment to compute process gain value, process time constant value and a dead time value of the industrial plant 106, according to an embodiment. The method 800 uses the Ziegler-Nichols method for computing the process gain (k) value, process time constant (T) value and the dead time (d) value. Accordingly, at act 802, the closed loop control system 202 is switched into a manual mode in the virtual simulation environment. At act 804, a step test to create a reaction curve of the closed loop control system's output is performed. At act 806, dead time (d) is computed based on the reaction curve. At act 808, a process time constant (T) is computed based on the reaction curve. At act 810, a process gain (k) is computed based on the reaction curve. The method 800 is further described in FIGS. 9A-9C.

Figure 9B:
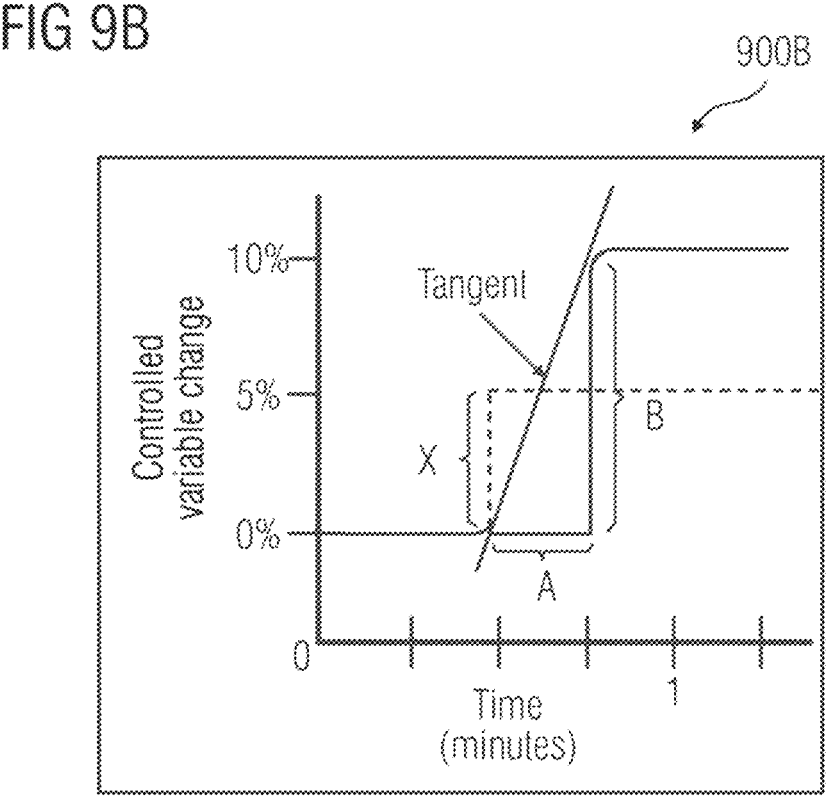
Figure 9C:
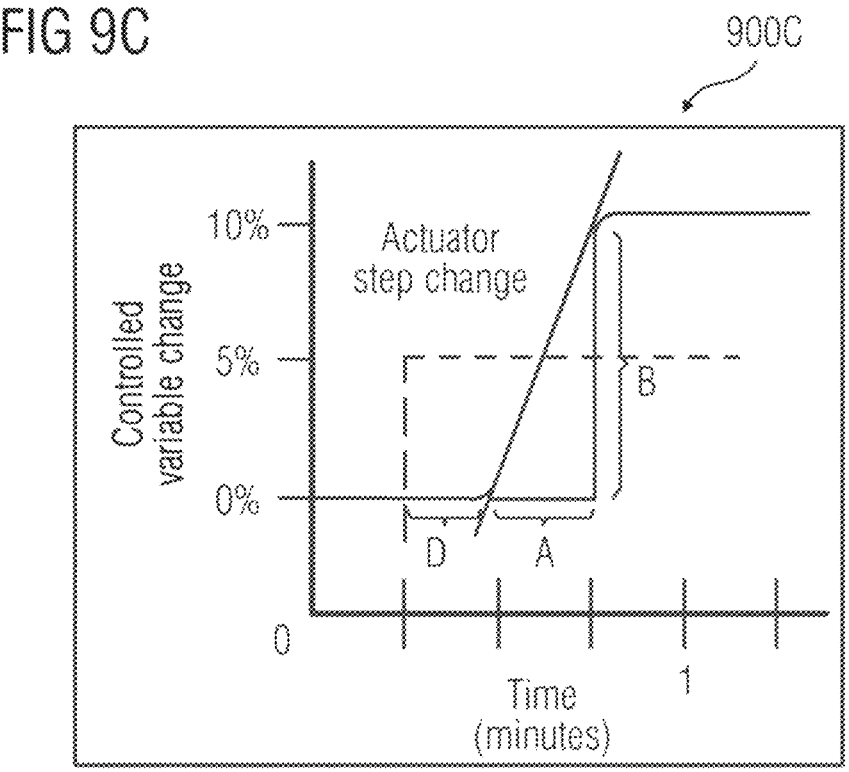

FIG. 9A-9C are schematic representations of reaction curve for computing the tuned process variables of the industrial plant 106, according to an exemplary embodiment. FIG. 9A illustrates closed loop control system's output when a step test is performed. In an exemplary implementation, a reaction curve for the step change to the closed loop control system is obtained when the PID controller is placed in manual mode and the controller is adjusted in such a way that the controlled variable changes at least 10%. FIG. 9B depicts the process of calculating the process time constant using a tangent to the reaction curve. The time between the point where this line intersects with the original process variable and the point where the test began is called the process time constant, A. Further, the parameter 'B' depicts the change in the process variables in percentage. The slope of this tangent curve, is called the reaction rate or R, given by B/A. The parameter 'X' is the percentage of controller's output change. With these values, process gain (k) is calculated as:

$$K=R/X \qquad \text{equation (4)}$$

With the above equation (4), a process value gain (k) is computed. Further, in FIG. 9C, a process of computing a dead time (d) using the reaction curve is depicted. In FIG. 9C, the parameter 'D' is the dead time value which is the time from when the step change is made to when the tangent line crosses the line of the initial process variable status. Hence, the dead time value (d) is computed.

Figure 10A:
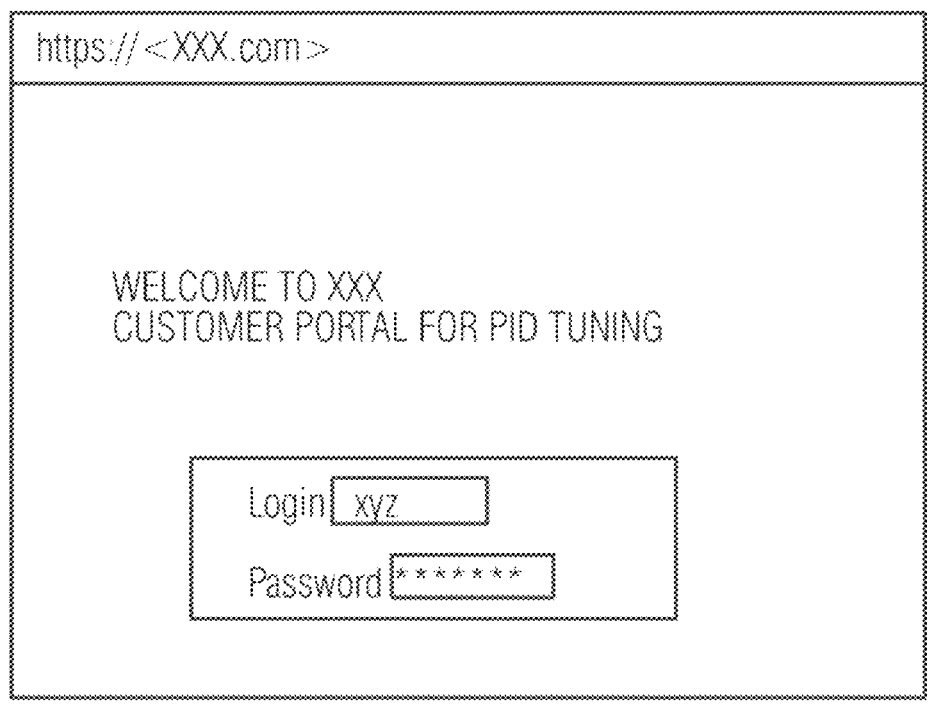
FIG. 10A-10D are snapshots of cloud-based tuning portal for optimizing tuning of an industrial plant, according to another exemplary embodiment.

FIG. 10A-10D are snapshots of cloud-based tuning portal for optimizing tuning of an industrial plant, according to another exemplary embodiment. FIG. 10A represents an exemplary log-in page of the cloud-based tuning portal as displayed on a user-interface of the client device, such as DCS 114. Each user owns a user profile handled and stored at the cloud server 102. A user logging into the tuning portal is authenticated by the cloud server 102 by comparing the user credentials inputted by the user at the client device, over the pre-stored credentials specific to the user. The tuning portal is hosted at the cloud server 102 and is made accessible via a web browser or an API to each of the client devices, such as DCS 114.

Figure 10B:
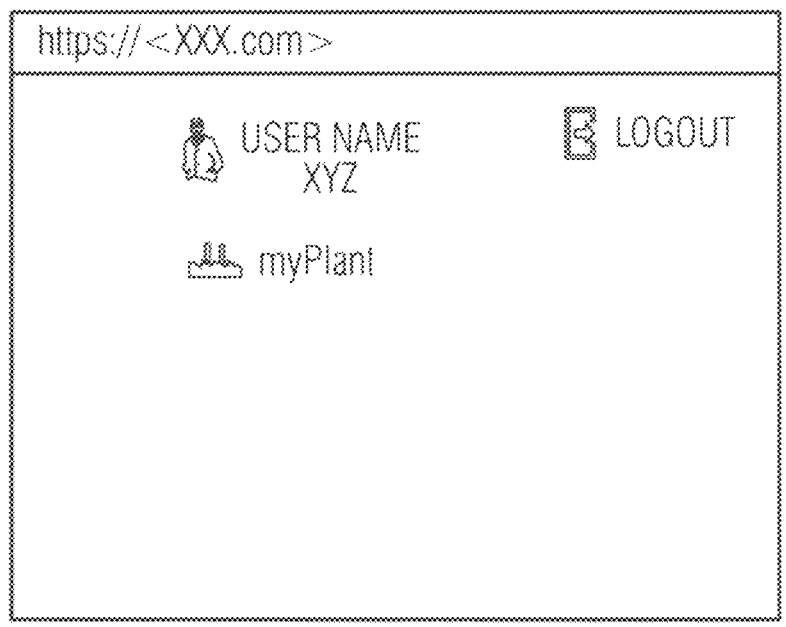

FIG. 10B represents an exemplary overview of a home page upon successful authentication of the user. The tuning portal maintains a user role-based access information for each user to enable customized view and download of the optimized tuned process variables. The cloud server 102 provides completeness of data to be visualized specific to a user and enables interaction of the user at the industrial plant with the cloud server 102. The home page of the tuning portal includes, but not limited to a myPlant option, a user profile details and an option to log-out the tuning portal. The embodiments herein disclose specific elements of the application which are unique to the implementations of the disclosure. However, a person skilled in the art could understand that the tuning portal may comprise other standard elements required for the execution of the tuning application.

Figure 10C:
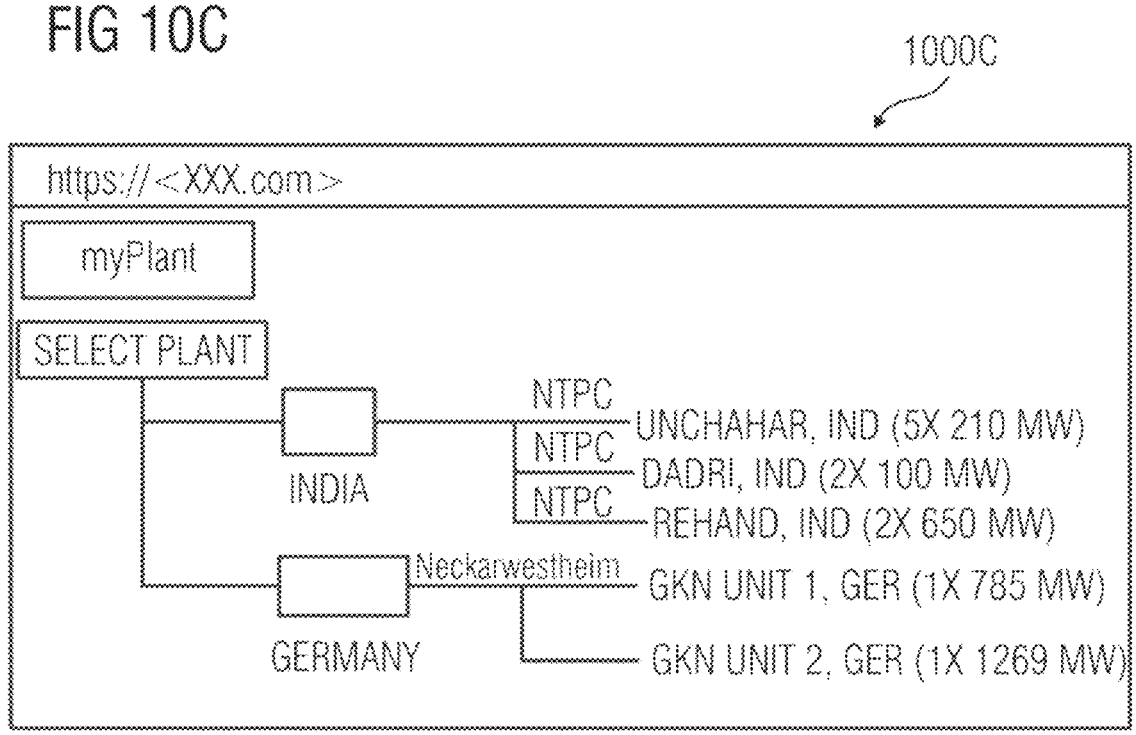

FIG. 10C represents an exemplary overview of a myPlant option when the user has selected the myPlant option on the home page. The myPlant option may comprise details related to a number of plants located at different geographical location. A user at the client device may select any plant situated at any geographical location by appropriately selecting them on the user interface.

Figure 10D:
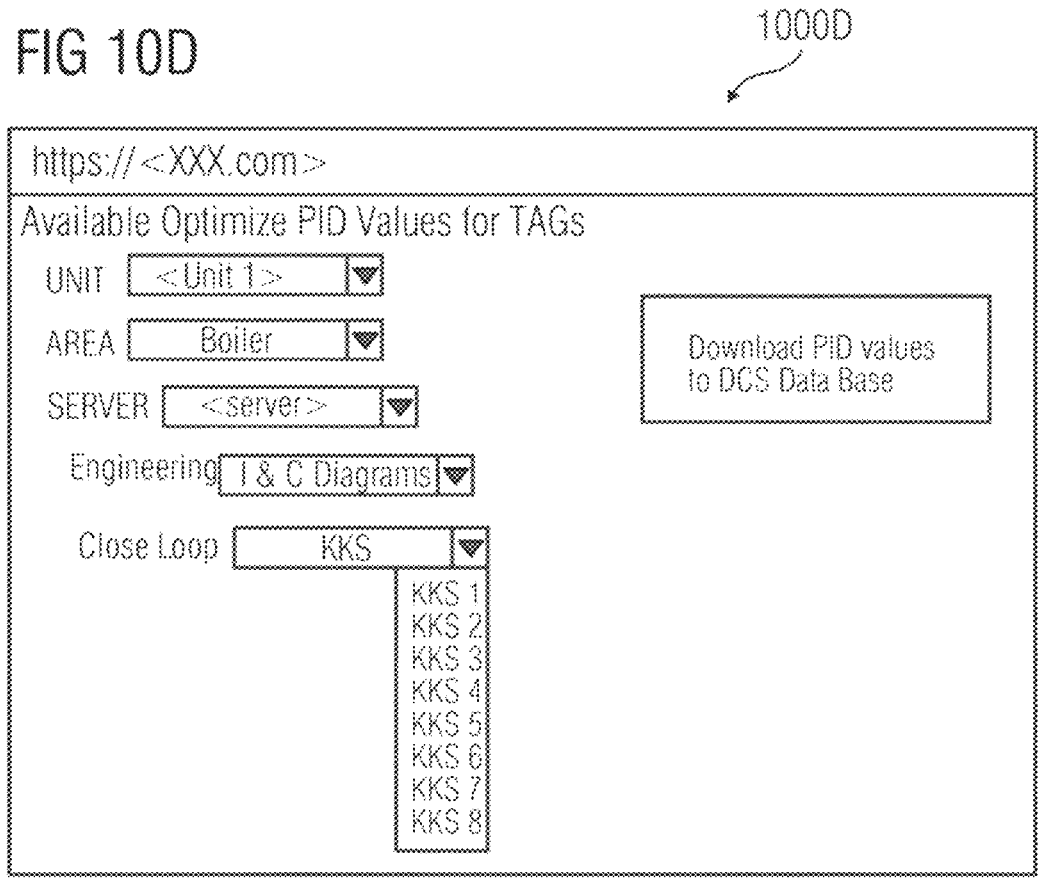

FIG. 10D represents an exemplary overview of an industrial plant data for a selected industrial plant situated at a particular geographical location. Consider if a user has selected a particular plant at particular location, then the cloud server 102 loads the following page at the client device specific for the plant selected by the user. This page includes fields associated with the selected industrial plant, such as but not limited to unit of the plant, area of the plant, server related to the plant, type of engineering and information on closed loops of the plant. Each of these fields includes 'n' number if items listed across for selection by a user. A user may select any item across each of these fields through a drop-down menu or through any standard mechanism known in the art. Upon selecting relevant item from a drop-down menu across each field of the plant, the user may now trigger download of the process variables to the DCS database, such as database 120 from the cloud server 102. Upon triggering this button on the user interface, the cloud server 102 retrieves the relevant information on optimized process variables specific to the industrial plant selected by the user and displays them to the user on the user interface of the client device.

The present disclosure may take a form of a computer program product including program modules accessible from computer-usable or computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology may be centralized or distributed (or a combination thereof) as known to those skilled in the art.

While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be apply to system/apparatus claims.

The invention claimed is:

1. A method for optimizing tuning of an industrial plant in a cloud environment, the method comprising:
receiving, by a processor, plant engineering data associated with an industrial plant from a plant environment, wherein the plant engineering data comprises raw process variables of the industrial plant;
generating, by the processor, a cloud-based virtual simulation environment synchronous to the industrial plant based on the plant engineering data, wherein the cloud-based virtual simulation environment comprises one or more virtual machines for virtually simulating the plant engineering data;
tuning, by the processor, the raw process variables of the industrial plant at the cloud-based virtual simulation environment to obtain optimized tuned process variables of the industrial plant; and
rendering, by the processor, the optimized tuned process variables for the industrial plant to a client device.

2. The method of claim 1, wherein the generating of the cloud-based virtual simulation environment comprises:
filtering the plant engineering data into a predefined category based on content of the plant engineering data;
extracting plant configuration information from the filtered plant engineering data;
generating one or more virtual machines corresponding to one or more actual machines of the industrial plant to form the cloud-based virtual simulation environment based on the extracted plant configuration information;
importing the filtered plant engineering data to each virtual machine of the one or more virtual machines; and
activating the generated one or more virtual machines corresponding to one or more actual machines of the industrial plant.

3. The method of claim 2, wherein the tuning of the raw process variables comprises:
determining whether the plant engineering data is available in the cloud-based virtual simulation environment;
tuning the raw process variables of the industrial plant at the cloud-based virtual simulation environment to compute process gain value, process time constant value, and a dead time value of the industrial plant when the plant engineering data is available in the generated cloud-based virtual simulation environment;
computing tuned process variables of the industrial plant based on the computed process gain value, the process time constant value, and the dead time value;
determining whether the tuned process variables of the industrial plant is optimized based on a decay ratio of the tuned process variables; and
obtaining optimized tuned process variables of the industrial plant when the tuned process variables of the industrial plant are optimized.

4. The method of claim 3, further comprising:
re-tuning the tuned process variables of the industrial plant at the cloud-based virtual simulation environment to obtain the optimized tuned process variables of the industrial plant when the tuned process variables of the industrial plant are not optimized.

5. The method of claim 2, further comprising:
re-tuning the tuned process variables of the industrial plant at the cloud-based virtual simulation environment to obtain the optimized tuned process variables of the industrial plant when the tuned process variables of the industrial plant are not optimized.

6. The method of claim 2, further comprising:
disconnecting a communication session with a plant environment upon receiving the plant engineering data.

7. The method of claim 2, further comprising:
receiving, by the processor, a user selection of an industrial plant from a user of the client device via a software application resided on the client device;
retrieving optimized process variables associated with the user selected industrial plant from a database; and
rendering the optimized process variables associated with the user selected industrial plant on a graphical user interface.

8. The method of claim 1, wherein the tuning of the raw process variables comprises:
determining whether the plant engineering data is available in the cloud-based virtual simulation environment;
tuning the raw process variables of the industrial plant at the cloud-based virtual simulation environment to compute process gain value, process time constant value, and a dead time value of the industrial plant when the plant engineering data is available in the generated cloud-based virtual simulation environment;
computing tuned process variables of the industrial plant based on the computed process gain value, the process time constant value, and the dead time value;
determining whether the tuned process variables of the industrial plant is optimized based on a decay ratio of the tuned process variables; and
obtaining optimized tuned process variables of the industrial plant when the tuned process variables of the industrial plant are optimized.

9. The method of claim 8, further comprising:
re-tuning the tuned process variables of the industrial plant at the cloud-based virtual simulation environment to obtain the optimized tuned process variables of the industrial plant when the tuned process variables of the industrial plant are not optimized.

10. The method of claim 1, further comprising:
disconnecting a communication session with a plant environment upon receiving the plant engineering data.

11. The method of claim 1, wherein the plant engineering data comprises raw process control variables of the industrial plant, industrial plant ID, plant configuration information, and access data specific to a user of the client device.

12. The method of claim 1, further comprising:
receiving, by the processor, a user selection of an industrial plant from a user of the client device via a software application resided on the client device;
retrieving optimized process variables associated with the user selected industrial plant from a database; and
rendering the optimized process variables associated with the user selected industrial plant on a graphical user interface.

13. A system for optimizing tuning of an industrial plant in a cloud environment, the system comprising:
one or more processors;
a memory coupled to the one or more processors, wherein the memory comprises an application repository having software applications stored therein;
a plant tuning management module; and
a tuned output rendering module,
wherein the plant tuning management module is configured to:
receive plant engineering data associated with an industrial plant from a plant environment, wherein the plant engineering data comprises raw process variables of the industrial plant;
generate a cloud-based virtual simulation environment synchronous to the industrial plant based on the plant engineering data, wherein the cloud-based virtual simulation environment comprises one or more virtual machines for virtually simulating the plant engineering data; and
tune the raw process variables of the industrial plant at the cloud-based virtual simulation environment to obtain optimized tuned process variables of the industrial plant; and
wherein the tuned output rendering module is configured to render the optimized tuned process variables for the industrial plant to a client device.

14. The system of claim 13, wherein, in the generation of the cloud-based virtual simulation environment, the plant tuning management module is configured to:
filter the plant engineering data into a predefined category based on content of the plant engineering data;
extract plant configuration information from the filtered plant engineering data;
generate one or more virtual machines corresponding to one or more actual machines of the industrial plant to form the cloud-based virtual simulation environment based on the extracted plant configuration information;
import the filtered plant engineering data to each virtual machine of the one or more virtual machines; and
activate the generated one or more virtual machines corresponding to one or more actual machines of the industrial plant.

15. The system of claim 13, wherein, in the tuning of the raw process variables, the plant tuning management module is configured to:
determine whether the plant engineering data is available in the cloud-based virtual simulation environment;
tune the raw process variables of the industrial plant at the cloud-based virtual simulation environment to compute a process gain value, a process time constant value, and a dead time value of the industrial plant when the plant engineering data is available in the generated cloud-based virtual simulation environment;
compute tuned process variables of the industrial plant based on the computed process gain value, the process time constant value, and the dead time value;
determine whether the tuned process variables of the industrial plant are optimized based on a decay ratio of the tuned process variables; and
obtain optimized tuned process variables of the industrial plant when the tuned process variables of the industrial plant are optimized.

16. The system of claim 15, wherein the plant tuning management module is configured to:
re-tune the tuned process variables of the industrial plant at the cloud-based virtual simulation environment to obtain the optimized tuned process variables of the industrial plant when the tuned process variables of the industrial plant are not optimized.

17. The system of claim 13, wherein the plant tuning management module is configured to:
disconnect a communication session with a plant environment upon receiving the plant engineering data.

18. The system of claim 13, wherein the plant engineering data comprises raw process control variables of the industrial plant, an industrial plant ID, plant configuration information, and access data specific to a user of the client device.

19. The system of claim 13, wherein the tuned output rendering module is configured to:
receive user selection of an industrial plant from a user of the client device via a software application resided on the client device;

retrieve optimized process variables associated with the user selected industrial plant from a database; and render the optimized process variables associated with the user selected industrial plant on a graphical user interface.

20. A non-transitory computer-readable medium, having instructions stored therein, which when executed by one or more processors, cause the one or more processors to:

receive plant engineering data associated with an industrial plant from a plant environment, wherein the plant engineering data comprises raw process variables of the industrial plant;

generate a cloud-based virtual simulation environment synchronous to the industrial plant based on the plant engineering data, wherein the cloud-based virtual simulation environment comprises one or more virtual machines for virtually simulating the plant engineering data;

tune the raw process variables of the industrial plant at the cloud-based virtual simulation environment to obtain optimized tuned process variables of the industrial plant; and render the optimized tuned process variables for the industrial plant to a client device.

* * * * *